United States Patent
Hundemer

(10) Patent No.: US 10,021,442 B1
(45) Date of Patent: *Jul. 10, 2018

(54) SYSTEMS AND METHODS FOR CAUSING A STUNT SWITCHER TO RUN A BUG-REMOVAL DVE

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/265,598

(22) Filed: Sep. 14, 2016

Related U.S. Application Data

(63) Continuation of application No. 13/828,632, filed on Mar. 14, 2013, now Pat. No. 9,473,801.

(51) Int. Cl.
*H04N 21/262* (2011.01)
*H04N 21/232* (2011.01)
(Continued)

(52) U.S. Cl.
CPC ...... *H04N 21/26258* (2013.01); *H04H 20/14* (2013.01); *H04H 60/06* (2013.01);
(Continued)

(58) Field of Classification Search
CPC .... H04H 20/10; H04H 20/103; H04H 20/106; H04H 20/26; H04H 60/06;
(Continued)

(56) References Cited

U.S. PATENT DOCUMENTS 5,485,611 A 1/1996 Astle
5,682,195 A 10/1997 Hendricks et al.
(Continued)

OTHER PUBLICATIONS

Hundemer, Hank J., U.S. Appl. No. 15/370,177, filed Dec. 6, 2016, 73 pages.
(Continued)

*Primary Examiner* — Pankaj Kumar
*Assistant Examiner* — Usha Raman
(74) *Attorney, Agent, or Firm* — McDonnell Boehnen Hulbert & Berghoff LLP

(57) ABSTRACT

Disclosed herein are systems and methods for causing a stunt switcher to run a bug-removal digital-video effect (DVE). In one aspect, a method involves selecting a first log-entry from a traffic log, wherein the first log-entry corresponds to a bug-removal DVE stored in the stunt switcher; selecting a second log-entry from the traffic log, wherein the second log-entry corresponds to a show-segment video-component (VC) and a start time; causing the VC to start being channeled through the stunt switcher proximate the start time; making a determination that a threshold time-period remains in a show portion of the VC; and responsive to making the determination that the threshold time-period remains in the show portion of the VC, causing the stunt switcher to run the stored bug-removal DVE, thereby removing any bug overlayed on the VC as a remainder of the VC is being channeled through the stunt switcher.

20 Claims, 7 Drawing Sheets

(51) Int. Cl.
    *H04N 21/234*     (2011.01)
    *H04N 21/24*     (2011.01)
    *H04H 20/14*     (2008.01)
    *H04H 60/06*     (2008.01)
    *H04N 5/268*     (2006.01)

(52) U.S. Cl.
    CPC ........... *H04N 5/268* (2013.01); *H04N 21/234* (2013.01); *H04N 21/2323* (2013.01); *H04N 21/23424* (2013.01); *H04N 21/2407* (2013.01); *H04N 21/262* (2013.01); *H04N 21/26283* (2013.01)

(58) Field of Classification Search
    CPC ....... H04N 21/23412; H04N 21/23424; H04N 21/26241; H04N 21/26258
    See application file for complete search history.

(56) References Cited

U.S. PATENT DOCUMENTS

| | | |
|---|---|---|
| 5,852,565 A | 12/1998 | Demos |
| 5,892,535 A | 4/1999 | Allen et al. |
| 6,020,931 A | 2/2000 | Bilbrey et al. |
| 6,069,668 A | 5/2000 | Woodham, Jr. et al. |
| 6,169,542 B1 | 1/2001 | Hooks et al. |
| 6,198,906 B1 | 3/2001 | Boetje et al. |
| 6,374,336 B1 | 4/2002 | Peters et al. |
| 7,010,530 B2 | 3/2006 | Bartkowiak et al. |
| 7,051,354 B2 | 5/2006 | Mears |
| 7,337,231 B1 | 2/2008 | Li |
| 7,881,191 B2 | 2/2011 | Liu et al. |
| 7,903,903 B1 | 3/2011 | Acker et al. |
| 8,201,201 B2 | 6/2012 | Des Jardins |
| 8,259,232 B2 | 9/2012 | Lino |
| 8,752,087 B2 | 6/2014 | Begeja et al. |
| 8,789,124 B1 | 7/2014 | Malaby et al. |
| 9,002,991 B2 | 4/2015 | Fletcher |
| 9,318,149 B2 * | 4/2016 | Griggs ................. G11B 27/028 |
| 9,396,475 B2 | 7/2016 | Cristofalo et al. |
| 9,549,208 B1 * | 1/2017 | Hundemer ....... H04N 21/23424 |
| 9,661,368 B1 * | 5/2017 | Hundemer ....... H04N 21/26241 |
| 9,788,034 B1 * | 10/2017 | Hundemer ....... H04N 21/26241 |
| 9,883,212 B2 * | 1/2018 | Propst ............ H04N 21/23424 |
| 9,888,297 B1 * | 2/2018 | Eldering ............. H04N 21/812 |
| 2001/0003846 A1 | 6/2001 | Rowe et al. |
| 2002/0107940 A1 | 8/2002 | Brassil |
| 2002/0184047 A1 | 12/2002 | Plotnick et al. |
| 2003/0001880 A1 | 1/2003 | Holtz et al. |
| 2003/0005437 A1 | 1/2003 | Feuer et al. |
| 2003/0097664 A1 | 5/2003 | Meyers et al. |
| 2003/0126597 A1 | 7/2003 | Darby et al. |
| 2003/0146915 A1 | 8/2003 | Brook et al. |
| 2003/0184679 A1 | 10/2003 | Meehan |
| 2003/0188321 A1 | 10/2003 | Shoff et al. |
| 2004/0038691 A1 | 2/2004 | Shin |
| 2004/0107136 A1 | 6/2004 | Nemirofsky et al. |
| 2004/0210945 A1 | 10/2004 | Snyder et al. |
| 2005/0062888 A1 | 3/2005 | Wood et al. |
| 2005/0120279 A1 | 6/2005 | Furukawa et al. |
| 2005/0229227 A1 | 10/2005 | Rogers |
| 2005/0273835 A1 | 12/2005 | Steelberg et al. |
| 2006/0143650 A1 | 6/2006 | Tanikawa et al. |
| 2006/0174281 A1 | 8/2006 | Park |
| 2007/0022437 A1 | 1/2007 | Gerken |
| 2007/0067800 A1 | 3/2007 | Wachtfogel et al. |
| 2007/0113264 A1 | 5/2007 | Rothschild |
| 2007/0143786 A1 | 6/2007 | Deitsch et al. |
| 2007/0162951 A1 | 7/2007 | Rashkovskiy et al. |
| 2007/0192788 A1 | 8/2007 | Danzl et al. |
| 2007/0220544 A1 | 9/2007 | Nash-Putnam |
| 2007/0261090 A1 | 11/2007 | Miller et al. |
| 2008/0010342 A1 | 1/2008 | Gebhardt et al. |
| 2008/0239162 A1 | 10/2008 | Munsell et al. |
| 2008/0244663 A1 | 10/2008 | Munsell et al. |
| 2008/0250447 A1 | 10/2008 | Rowe et al. |
| 2008/0250448 A1 | 10/2008 | Rowe et al. |
| 2008/0276269 A1 | 11/2008 | Miller et al. |
| 2009/0070807 A1 | 3/2009 | Jacobs |
| 2009/0070808 A1 | 3/2009 | Jacobs |
| 2009/0070837 A1 | 3/2009 | Jacobs |
| 2009/0164904 A1 | 6/2009 | Horowitz et al. |
| 2009/0187826 A1 * | 7/2009 | Heimbold ............... H04N 5/262 715/719 |
| 2009/0268806 A1 | 10/2009 | Kim et al. |
| 2009/0276805 A1 | 11/2009 | Andrews, II et al. |
| 2010/0050083 A1 | 2/2010 | Axen et al. |
| 2010/0103324 A1 * | 4/2010 | Maegawa ............ H04H 20/103 348/705 |
| 2010/0103325 A1 * | 4/2010 | Maegawa ............ H04N 5/2624 348/705 |
| 2010/0166257 A1 | 7/2010 | Wredenhagen |
| 2010/0199299 A1 | 8/2010 | Chang et al. |
| 2011/0249955 A1 * | 10/2011 | Ito ........................ G11B 27/031 386/241 |
| 2011/0283311 A1 | 11/2011 | Luong |
| 2011/0293244 A1 | 12/2011 | Kuriyama |
| 2011/0321084 A1 | 12/2011 | Takahashi et al. |
| 2012/0084811 A1 | 4/2012 | Thompson et al. |
| 2012/0185905 A1 | 7/2012 | Kelley |
| 2012/0291067 A1 | 11/2012 | Wiles |
| 2013/0055306 A1 | 2/2013 | Macrae et al. |
| 2013/0272678 A1 | 10/2013 | Bryan et al. |
| 2013/0276038 A1 * | 10/2013 | Kiura ................. H04N 21/2387 725/88 |
| 2014/0089966 A1 | 3/2014 | Briggs et al. |
| 2014/0165097 A1 | 6/2014 | Chase |
| 2014/0195675 A1 | 7/2014 | Silver |
| 2014/0259051 A1 | 9/2014 | Stein et al. |
| 2014/0259074 A1 | 9/2014 | Ansari et al. |
| 2014/0304366 A1 | 10/2014 | Fletcher |
| 2014/0304367 A1 | 10/2014 | Fletcher |
| 2014/0317666 A1 | 10/2014 | Chiarulli et al. |
| 2014/0358267 A1 | 12/2014 | Littlejohn et al. |
| 2014/0373044 A1 | 12/2014 | Carrol et al. |
| 2014/0380394 A1 | 12/2014 | Perron et al. |
| 2015/0074535 A1 * | 3/2015 | Silberstein ........... G11B 27/034 715/726 |
| 2015/0373394 A1 * | 12/2015 | Marcus ............. G06Q 30/0242 725/32 |
| 2017/0019715 A1 * | 1/2017 | Hundemer ............. H04L 67/18 |
| 2017/0244995 A1 * | 8/2017 | Coffaro ................ H04N 21/266 |
| 2017/0346882 A1 * | 11/2017 | Basu .................. H04L 67/2804 |

OTHER PUBLICATIONS

Notice of Allowance dated Sep. 27, 2017, U.S. Appl. No. 15/370,177, filed Dec. 6, 2016.
Non-Final Office Action dated Apr. 4, 2017 of U.S. Appl. No. 15/370,177, filed Dec. 6, 2016.
Hundemer, Hank J., U.S. Appl. No. 13/828,632, filed Mar. 14, 2013, 41 pages.
Hundemer, Hank J., U.S. Appl. No. 13/828,682, filed Mar. 14, 2013, 40 pages.
Hundemer, Hank J., U.S. Appl. No. 13/828,939, filed Mar. 14, 2013, 47 pages.
Hundemer, Hank J., U.S. Appl. No. 13/829,017, filed Mar. 14, 2013, 45 pages.
Hundemer, Hank J., U.S. Appl. No. 13/829,150, filed Mar. 14, 2013, 41 pages.
Hundemer, Hank J., U.S. Appl. No. 13/829,368, filed Mar. 14, 2013, 52 pages.
Hundemer, Hank J., U.S. Appl. No. 14/458,789, filed Aug. 13, 2014, 39 pages.
Non-final office action dated May 14, 2014 of U.S. Appl. No. 13/828,632, filed Mar. 14, 2013.
SMPTE Recommended Practice, "Implementing Broadcast Exchange Format (BXF)" RP 2021-9-2009, published Aug. 19, 2009, pp. 1-90.
Non-final office action dated Mar. 7, 2014 of U.S. Appl. No. 13/828,682, filed Mar. 14, 2013.

(56) References Cited

OTHER PUBLICATIONS

Final office action dated Jun. 24, 2014 of U.S. Appl. No. 13/828,682, filed Mar. 14, 2013.
Notice of Allowance dated May 21, 2014 of U.S. Appl. No. 13/828,939, filed Mar. 14, 2011.
Non-final office action dated Jun. 26, 2014 of U.S. Appl. No. 13/829,150, filed Mar. 14, 2013.
Non-final office action dated Jul. 3, 2014 of U.S. Appl. No. 13/829,368, filed Mar. 14, 2013.
Advisory Action dated Sep. 24, 2014 of U.S. Appl. No. 13/828,682, filed Mar. 14, 2013.
Office Action dated Oct. 6, 2014 of U.S. Appl. No. 13/829,150, filed Mar. 14, 2013.
Non-Final Office Action dated Jan. 5, 2015 of U.S. Appl. No. 13/828,632, filed Mar. 14, 2011.
SMTPE ST 2021-4:2012, "Broadcast Exchange Format (BFX)—Schema Documentation".
SMTPE ST 2021-3:2012, "Broadcast Exchange Format (BFX)—Use Cases", Mar. 14, 2012.
SMTPE ST 2021-1:2012, "Broadcast Exchange Format (BFX)—Requirements and Informative Notes", Mar. 14, 2012.
Non-Final Office Action dated Jan. 12, 2015 of U.S. Appl. No. 13/829,368, filed Mar. 14, 2013.
Hundemer, Hank J., U.S. Appl. No. 14/724,469, filed May 28, 2015, 41 pages.
Notice of Allowance dated May 8, 2015 of U.S. Appl. No. 13/828,939, filed Mar. 14, 2013.
Office Action dated Jul. 31, 2015 of U.S. Appl. No. 13/828,632, filed Mar. 14, 2013.
Office Action dated Aug. 25, 2015 of U.S. Appl. No. 13/829,017, filed Mar. 14, 2013.
Non-Final Office Action dated Jan. 29, 2016 of U.S. Appl. No. 14/458,789, filed Aug. 13, 2014.
Final Office Action dated Mar. 8, 2016 of U.S. Appl. No. 13/829,017, filed Mar. 14, 2013.
Pre-Interview First Office Action dated Jun. 6, 2016 of U.S. Appl. No. 14/724,469, filed May 28, 2015.
Advisory Action dated Jun. 16, 2016 of U.S. Appl. No. 13/829,017, filed Mar. 14, 2013.
Non-Final Action Office dated May 23, 2018 of U.S. Appl. No. 13/828,682 filed Mar. 14, 2013.
PTAB Decision dated Feb. 22, 2018, U.S. Appl. No. 13/828,682 filed Mar. 14, 2013.
Non-Final Action Office dated Apr. 18, 2018 of U.S. Appl. No. 15/402,764 filed Jan. 10, 2017.

\* cited by examiner

SYSTEMS AND METHODS FOR CAUSING A STUNT SWITCHER TO RUN A BUG-REMOVAL DVE

CROSS REFERENCE TO RELATED APPLICATIONS

This application relates to U.S. patent application Ser. No. 13/828,682, entitled "Systems and Methods for Causing a Stunt Switcher to Run a DVE," U.S. patent application Ser. No. 13/829,150 (now U.S. Pat. No. 9,049,386), entitled "Systems and Methods for Causing a Stunt Switcher to Run a Bug-Overlay DVE," U.S. patent application Ser. No. 13/828,939 (now U.S. Pat. No. 9,049,618), entitled "Systems and Methods for Causing a Stunt Switcher to Run a Bug-Overlay DVE with Absolute Timing Restrictions," U.S. patent application Ser. No. 13/829,368 (now U.S. Pat. No. 9,185,309), entitled "Systems and Methods for Causing a Stunt Switcher to Run a Snipe-Overlay DVE," and U.S. patent application Ser. No. 13/829,017, entitled "Systems and Methods for Causing a Stunt Switcher to Run a Multi-Video-Source DVE," all of which are commonly assigned to the assignee of the present application and are hereby incorporated by reference herein in their entirety.

USAGE AND TERMINOLOGY

Throughout this application, with respect to all reasonable derivatives of such terms, and unless otherwise specified (and/or unless the particular context clearly dictates otherwise), each usage of:

"a" or "an" is meant to read as "at least one."
"the" is meant to be read as "the at least one."
the term "video" refers to any material represented in a video format (i.e., having multiple frames). In some instances, video may include multiple sequential frames that are identical or nearly identical, and that may give the impression of a still image. Video may or may not include an audio portion.
the term "video component" (VC) refers to video that one of ordinary skill in the art would typically consider to be self-contained, and that is typically separately scheduled by a traffic system (also referred to as a scheduling-and-sequencing system) of a television-broadcasting system.

TECHNICAL FIELD

The disclosed systems and methods relate generally to television-broadcasting technology.

BACKGROUND

A television-broadcasting system typically includes a traffic system that performs functions related to broadcast scheduling. For example, the traffic system may facilitate the creation of a traffic-log (log), which is a broadcast schedule for a given station during a given time period. The log may include multiple ordered log entries, each of which may correspond to a VC. Each log entry may also include scheduling data for the video, and therefore the log may generally represent the scheduled sequence of VCs intended to be broadcast during the corresponding time period.

There are several types of VCs, non-limiting examples of which include a show-segment VC, a commercial VC, and a promotion VC. A show-segment VC consists of at least a portion of a show, and potentially one or more commercials. A show may be, for example, an episode of a sitcom, a news program, or a movie. A commercial VC consists of a single commercial. Typically, a television-broadcasting company broadcasts a commercial VC in exchange for payment or other compensation from the provider of the commercial VC. A promotion VC consists of video that promotes something such as an event or another VC. Unlike a commercial VC, the television-broadcasting company typically does not receive a payment or other compensation from a third-party for broadcasting the promotion VC.

The traffic system may communicate with a master control system (MCS), which is the technical hub of a television-broadcasting system and is typically the final point before video is sent to an air-chain system for broadcast. More specifically, the traffic system typically communicates with an automation system of the MCS. The automation system is the logic center of the MCS and may cause the MCS and/or another entity to perform various functions.

Through a communication path, the traffic system may provide the log to the automation system, such that the automation system may traverse and select log entries. The automation system may then cause the MCS and/or another entity to perform certain functions for each selected log-entry at an appropriate time (i.e., based on the corresponding scheduling data). For example, the automation system may cause a recording-and-playout device (RAPD) to retrieve and playout a stored VC such that it may be channeled through one or more entities within the MCS (e.g., routers and switchers), and sent to an air-chain system for broadcast. In another example, the automation system may cause a streaming VC received from a streaming-video source (SVS) to be channeled through the MCS and sent to the air-chain system for broadcast.

In some instances, when video is channeled through the MCS, the video may be channeled through a stunt switcher of the MCS. The stunt switcher performs functions related to digital-video effects (DVE) (sometimes referred to as "stunt work"). For example, the stunt switcher may run a DVE, which dynamically manipulates video that is being channeled through the stunt switcher.

SUMMARY

In one aspect, a method for use in a television-broadcasting system having a stunt switcher is disclosed. The method involves (i) selecting a first log-entry from a traffic-log (log), wherein the first log-entry corresponds to a bug-removal digital-video effect (DVE) stored in the stunt switcher; (ii) selecting a second log-entry from the log, wherein the second log-entry corresponds to a show-segment video-component (VC) and a start time; (iii) causing the VC to start being channeled through the stunt switcher proximate the start time; (iv) making a determination that a threshold time-period remains in a show portion of the VC; and (v) responsive to making the determination that the threshold time-period remains in the show portion of the VC, causing the stunt switcher to run the stored bug-removal DVE, thereby removing any bug overlayed on the VC as a remainder of the VC is being channeled through the stunt switcher.

In another aspect, another method for use in a television-broadcasting system having a stunt switcher is disclosed. The method involves (i) selecting a first log-entry from a log, wherein the first log-entry corresponds to a bug-removal DVE stored in the stunt switcher; (ii) selecting a second log-entry from the log, wherein the second log-entry corresponds to a show-segment VC and a start time; (iii) causing the VC to start being channeled through the stunt switcher proximate the start time; and (iv) causing the stunt switcher to run the stored bug-removal DVE proximate an end of a show portion of the VC, thereby removing any bug overlayed on the VC as a remainder of the VC is being channeled through the stunt switcher.

In another aspect, a television-broadcasting system includes a (i) stunt switcher; and (ii) an automation system having a computer-readable medium including a set of program instructions, that when executed by the automation system, cause the automation system to perform a set of functions. The set of functions includes (i) selecting a first log-entry from a log, wherein the first log-entry corresponds to a bug-removal DVE stored in the stunt switcher; (ii) selecting a second log-entry from the log, wherein the second log-entry corresponds to a show-segment VC and a start time; (iii) causing the VC to start being channeled through the stunt switcher proximate the start time; (iv) making a determination that a threshold time-period remains in a show portion of the VC; and (v) responsive to making the determination that the threshold time-period remains in the show portion of the VC, causing the stunt switcher to run the stored bug-removal DVE, thereby removing any bug overlayed on the VC as a remainder of the VC is being channeled through the stunt switcher.

DETAILED DESCRIPTION OF THE DRAWINGS

I. Overview

Figure 1:
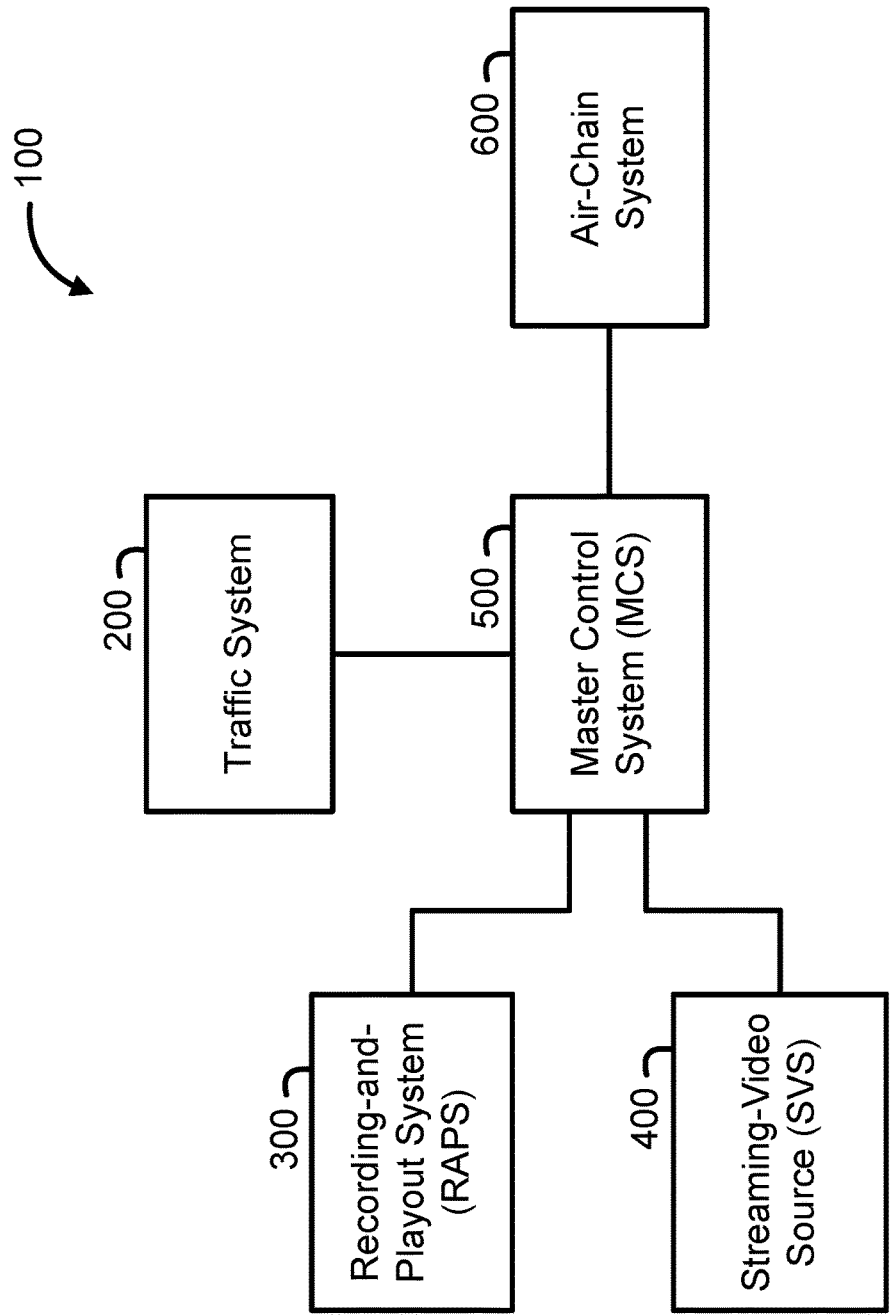
FIG. 1 is a simplified block diagram of an example television-broadcast system.

In the television-broadcasting industry, traffic systems are provided by multiple vendors and often include distinguishing features. However, for a variety of reasons such as to provide compatibility, many traffic systems create logs according to a general industry-wide standard. Likewise, many automation systems are configured to receive and process logs based on this standard. A log entry based on this standard may include certain attributes, including for example a house identifier, a source identifier, a start time, a duration, an episode number, a segment number, and/or an one or more auxiliary notations. These attributes may be generated automatically (e.g., by the traffic system) or may be provided by a user such as a traffic manager.

Typically, a log entry includes one of either a house identifier or a source identifier. If the log entry corresponds to a stored VC, the log entry typically includes a house identifier (sometimes called a "house number"), which identifies the VC. Typically, the house identifier is a unique identifier within a given television-broadcasting system, and maps to a file location in a data storage where the VC is stored. As such, by obtaining the house identifier of a log entry, the automation system may use a mapping table to determine the appropriate file location, and may then retrieve the VC that is stored in that file location. Alternatively, if the log entry corresponds to a streaming VC, the log entry may include a source identifier, which identifies an SVS (e.g., via a mapping table) that provides the streaming VC The start time may indicate the intended start time of a corresponding VC. The start time may be represented as an absolute start time or as a calculated start time. A calculated start time indicates that the start time is when the preceding log entry gets "completed" (i.e., when the VC or streaming video of the previous log entry has played for its corresponding duration). In some instances, the start time may be unknown until it occurs, and therefore the start time may be represented as a manual start time. In such instances, the corresponding VC is not started until a request is received from a user or a device. The duration indicates the duration of the corresponding VC. In some instances, the duration may be unknown and therefore it may not be included in the log entry. The episode number identifies a particular episode of a show, and the segment number identifies a particular segment number of a show. The episode number and the segment number are included in a log entry that corresponds to a show-segment VC. The one or more auxiliary notations are typically notes that are reviewed by a user (e.g., a traffic manager may provide a note to a master control operator about the corresponding log entry).

The above-described attributes may be stored in corresponding fields in the log entry. For example, the house identifier may be stored in a house-identifier field and the one or more auxiliary notations may be stored in one or more auxiliary-notation fields. Two examples of well-known traffic systems that use the attributes as described above include WO Traffic provided by WideOrbit Inc. of San Francisco, Calif., and OSi-Traffic™ provided by Harris Corporation of Melbourne, Fla.

As discussed above, after an automation system selects a log entry, the automation system may channel the corresponding VC through a stunt switcher, at which time the stunt switcher may run a DVE to dynamically manipulate the video. Running the DVE in this manner typically occurs in response to a user submitting a request to the stunt switcher via a user interface of the stunt switcher.

Submitting such a request to the stunt switcher may be a time-sensitive event. For example, consider a particular type of DVE, namely a bug-overlay DVE. A bug-overlay DVE is a DVE that is configured to overlay a graphic or short video on video. For example, a bug-overlay DVE may be configured to overlay a small "ch. 9" graphic on the lower right-hand corner of the video. In some instances, it may be desired to overlay the graphic only during a show portion of a show-segment VC. Therefore, in one example, a few second after a show-segment VC starts, a user may submit a request to the stunt switcher to run the bug-overlay DVE. Then, a few seconds before the end of the show portion of the show-segment VC, the user may submit a request to the stunt switcher to run another type of DVE, namely a bug-removal DVE that removes the overlayed bug.

Among other things, this process is manually intensive and is prone to error as it requires a user to constantly monitor the log and the current time to determine when a bug-overlay DVE and a bug-removal DVE should be run before submitting an appropriate request to the stunt switcher.

This process may be improved by configuring a log entry such that the log entry may trigger the running of a bug-overlay DVE at an appropriate time. Accordingly, a user such as a traffic manager may use a log as a mechanism for scheduling bug-overlay DVEs.

The disclosed systems and methods further improve upon this process by configuring a log entry such that the log entry may trigger the running of a bug-removal DVE at an appropriate time. Accordingly, a user such as a traffic manager may use a log as a mechanism for scheduling bug-removal DVEs.

In one example, a log entry includes an identifier that maps to a set of scripts that, when executed, cause an automation system to cause a stunt switcher to run a bug-removal DVE. Further, the identifier may be stored in the house-identifier field of the log entry, such that it may be "disguised" as a house identifier as described above. Among other things, this allows the disclosed systems and methods to provide the above-described functionality while adhering to protocols used by many existing traffic systems such as those identified above.

II. Example Television-Broadcasting System

FIG. 1 shows an example television-broadcasting system, generally designated 100. The television-broadcast system 100 may be configured to perform a variety of functions that relate to television broadcasting. The television-broadcasting system 100 may include a traffic system 200, a recording-and-playout system (RAPS) 300, an SVS 400, a MCS 500, and an air-chain system 600. The MCS 500 may serve as the hub of the television-broadcasting system 100 and may connect to each of the traffic system 200, the RAPS 300, the SVS 400, and the air-chain system 600. Generally, the television-broadcasting system 100 may be configured such that video may be sent from the RAPS 300, the SVS 400, or another source, through the MCS 500, and to the air-chain system 600 for broadcast.

A. Traffic System

Figure 2:
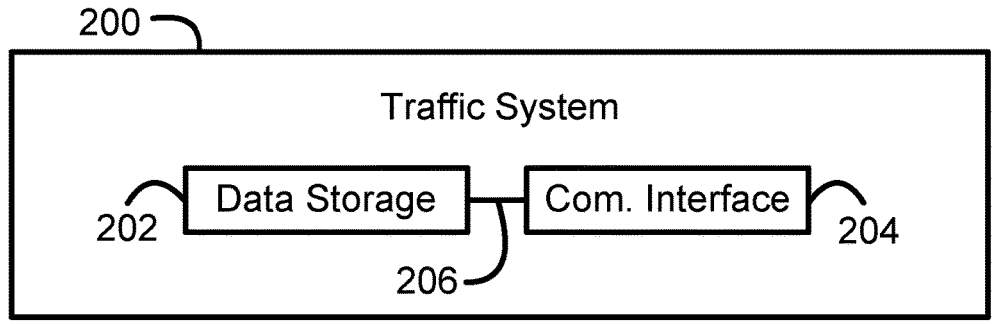
FIG. 2 is a simplified block diagram of an example traffic system.

FIG. 2 shows the traffic system 200 in greater detail. The traffic system 200 may be configured for creating and sending a log to the MCS 500, and may include a data storage 202 and a communication interface 204, both of which may be connected to each other via a connection mechanism (e.g., a bus) 206. The traffic system 200 may be configured to store logs in the data storage 202, and to send the stored logs, via the communication interface 204, to the MCS 500. As discussed above, two example traffic systems are WO Traffic provided by WideOrbit Inc. of San Francisco, Calif., and OSi-Traffic™ provided by Harris Corporation of Melbourne, Fla.

B. RAPS

Figure 3:
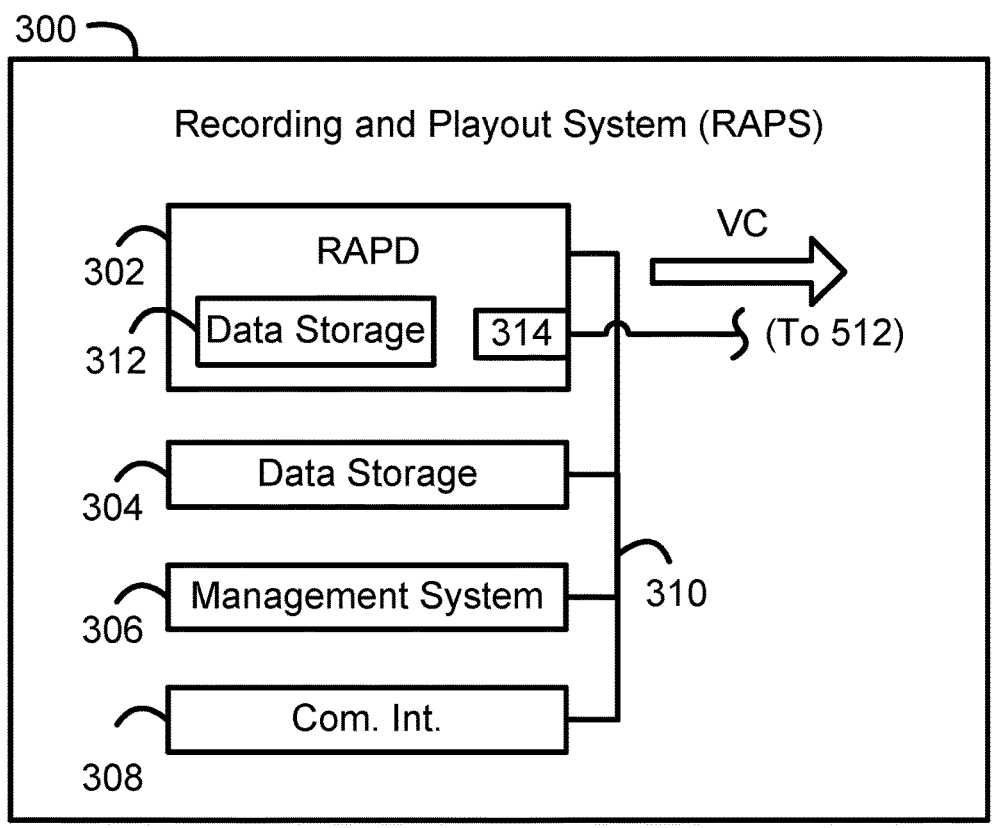
FIG. 3 is a simplified block diagram of an example recording-and-playout system.

FIG. 3 shows the RAPS 300 in greater detail. The RAPS 300 may be configured to record and playout VCs for use by the MCS 500, and may include a recording-and-playout device (RAPD) 302, a data storage 304, a management system 306, and a communication interface 308, each of which may be connected to each other via a connection mechanism 310.

The RAPD 302 may be configured to record VCs (e.g., a VC retrieved from the data storage 304) and playout (i.e. send) VCs, via the MCS 500, to the air-chain system 600. The RAPD 302 may include a data storage 312 and an output 314, both of which may be connected to each other by a connection mechanism (not shown). The data storage 312 may be used for storing VCs that may be sent via the output 314. The management system 306 may be configured to manage the RAPD 302 by organizing and moving VCs back-and-forth between the RAPD and the data storage 304.

The communication interface 308 may connect the RAPS 300 to the MCS 500 or to another entity. An example of a RAPD is the K2 server provided by Grass Valley™ of San Francisco, Calif.

C. SVS

Figure 4:
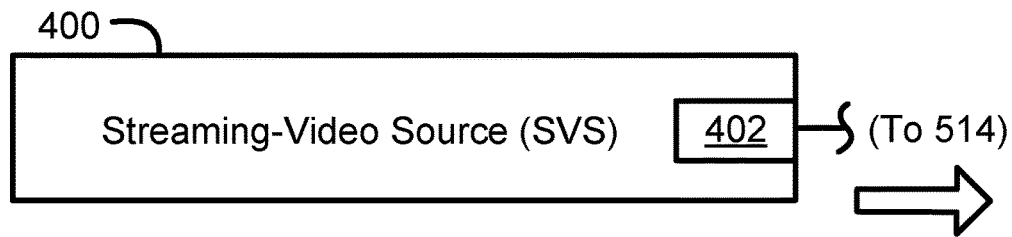
FIG. 4 is a simplified block diagram of an example streaming-video source.

FIG. 4 shows the SVS 400 in greater detail. The SVS 400 is a source configured to send streaming video (e.g., a streaming VC) via an output 402. Streaming video is often received at or shortly before the time when the video is broadcast. In one example, the SVS 400 may send streaming video based on the high-definition serial digital interface (HD-SDI) standard with a data transfer rate of 1.485 Gbps. An example of an SVS is a satellite (e.g., that streams so-called "network television" video) or a newsroom production control system.

D. MCS

Figure 5:
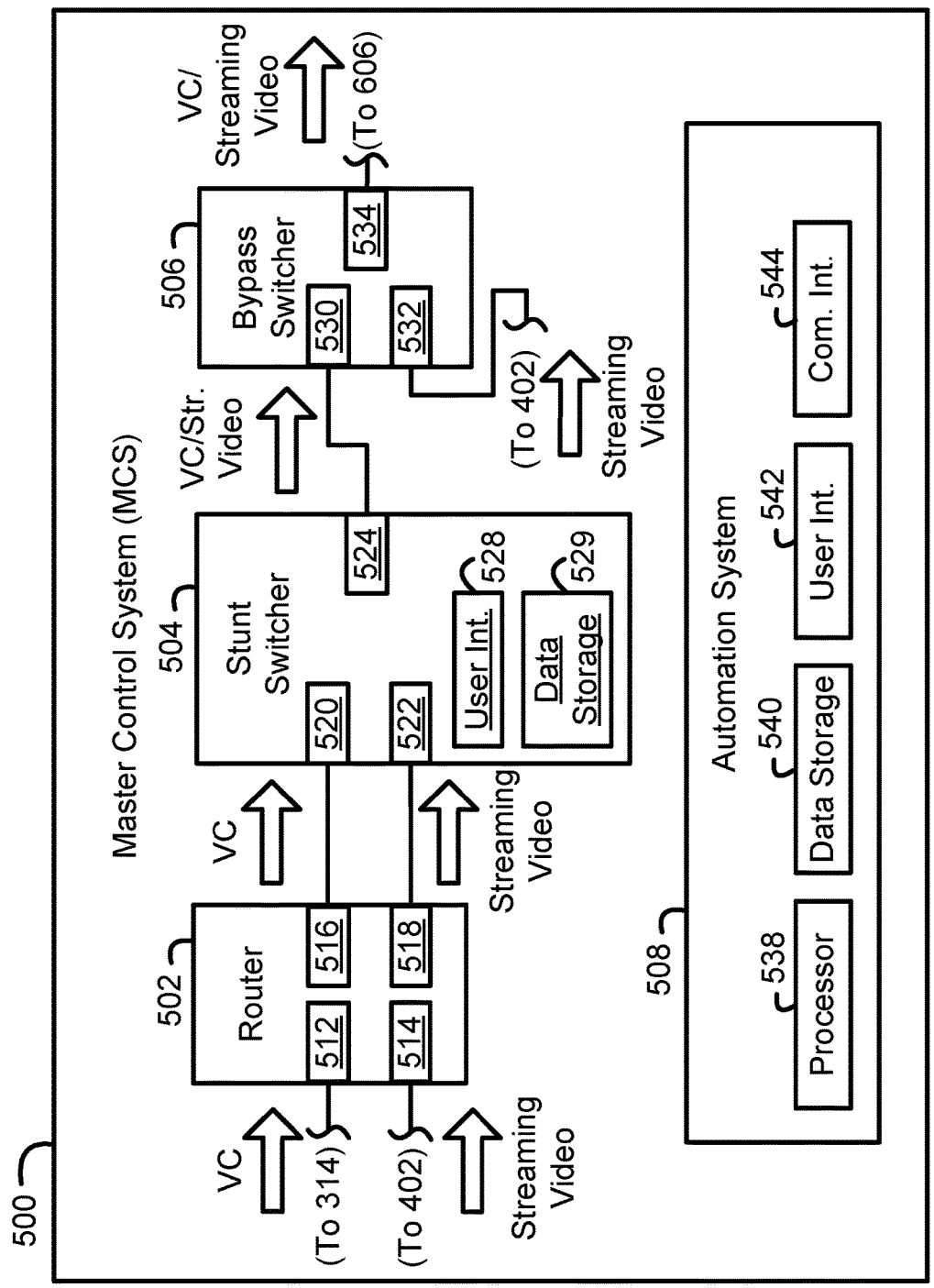
FIG. 5 is a simplified block diagram of an example master control system.

FIG. 5 shows the MCS 500 in greater detail. The MCS 500 may be configured to receive video, channel the video through one or more sources, and send the video to the air-chain system 600 for broadcast. In one example, the MCS 500 includes a router 502, a stunt switcher 504, a bypass switcher 506, and an automation system 508, each of which may be connected to each other by a connection mechanism (not shown).

1. Router

The router 502 may be configured to channel video by mapping inputs to outputs, and may include one or more inputs, including for example, a first input 512 and a second input 514, and one or more outputs, including for example, a first output 516 and a second output 518. The router 502 may also include a communication interface (not shown). The inputs 512, 514, the outputs 516, 518, and the communication interface may each be connected to each other by a connection mechanism (not shown). Notably, a router may and often does have more inputs than outputs such that it may connect many sources to relatively fewer destinations.

The RAPD 302 may be connected to the router 502 via the output 314 and the input 512. The SVS 400 may be connected to the router 502 via the output 402 and the input 514. An example of a router is the Blackmagic Design Videohub provided by Blackmagic Design Pty. Ltd. Of Fremont, Calif.

2. Stunt Switcher

The stunt switcher 504 may be configured to channel video by mapping inputs to outputs, and may include one or more inputs, including, for example, a first input 520 and a second input 522, and one or more outputs, including, for example, an output 524. The stunt switcher 504 may also include a user interface 528, a data storage 529, and a communication interface (not shown).

The inputs 520, 522, the output 524, the user interface 528, the data storage 529, and the communication interface may each be connected to each other by a connection mechanism (not shown). The router 502 may be connected to the stunt switcher 504 via the output 516 and the input 520. The router 502 may also be connected to the stunt switcher 504 via the output 518 and the input 522. Like a router, a stunt switcher may and often does have more inputs than outputs such that it may connect many sources to relatively fewer destinations. An example of a stunt switcher is the Miranda NVISION NVS5100MC provided by NVision, Inc. of Coppell, Tex.

The stunt switcher 504 may further be configured to perform various functions related to DVEs. A DVE is an effect module (e.g., in the form of a set of program instructions) that is configured to be executed or "run." When run, a DVE dynamically manipulates video being channeled through the stunt switcher. Running a DVE may involve using one or more layers known as "keys" to overlay graphics, video, or other media on video. In some instances, running a DVE may involve simply "resetting" the keys, thereby removing any media being overlayed as a result of another DVE being run.

The stunt switcher 504 may be configured to assist a user in designing a DVE, such as via the user interface 528. Once a DVE is designed, the stunt switcher 504 may store the DVE in the data storage 529. In one example, the stunt switcher may store DVEs in respective DVE registers within the data storage 529. The stunt switcher 504 may also store media used in connection with the DVE in the data storage 529. This allows the stunt switcher 504 to retrieve media as needed. For example, when running a DVE, the stunt switcher 504 may retrieve media from a particular graphic or video register in the data storage 529 as indicated by the DVE. Media may be stored in the data storage 529 in a variety of manners, such as via a file transfer protocol (FTP). As such, by overwriting media stored in the data storage 529, the result of a DVE that is run may be changed.

Once a DVE is designed and stored in the data storage 529, the stunt switcher 504 may then retrieve and run the DVE. In some instances, this may occur in response to a request being received from a user (e.g., via the user interface 528) or from the automation system 508. Accordingly, when a stunt switcher runs a DVE, a VC that is being channeled through the stunt switcher 504 may be dynamically manipulated. This manipulated video may then be sent through the bypass switcher 506 and to the air-chain system 600 for broadcast as described in greater detail below.

As noted above, one example type of DVE is a bug-overlay DVE. A bug-overlay DVE is a DVE that is configured to overlay a graphic or video (referred to herein as a "bug") on video as it is channeled through the stunt switcher 504. For example, a bug-overlay DVE may be configured to (when run) overlay a graphic (referred to herein as a "bug graphic") such as a small "ch. 9" graphic or other station logo graphic on the lower right-hand corner of the video. As another example, a bug-overlay DVE may be configured to (when run) overlay a short-duration video (referred to herein as a "bug video") on the lower right-hand corner of the video. A bug-video is typically less than five seconds and is typically configured to be played in a looping fashion. As such, the bug video may have a last frame that smoothly transitions into the first frame. This may create the illusion of a continuously "moving" bug graphic (e.g., a spinning station logo graphic) being overlayed on video. In some instances, a bug may be partially transparent such that it does not completely block the underlying video. This is sometimes referred to as a ghost bug.

Another example type of DVE is a bug-removal DVE. A bug-removal DVE is configured to (when run) remove an overlayed bug. In some instances, a bug-removal DVE may simply "reset" all keys such that no overlaying media or other effects remain, thereby ensuring that any overlayed bug is removed from the video as the video is being channeled through the stunt switcher.

3. Bypass Switcher

The bypass switcher 506 may be configured to channel video by mapping inputs to outputs. The bypass switcher 506 may include at least one input including, for example, a first input 530 and a second input 532, and at least one output including, for example, an output 534. The bypass switcher 506 may also include a communication interface (not shown). The inputs 530, 532, the output 534, and the communication interface may all be connected to each other by a connection mechanism (not shown). The stunt switcher 504 may be connected to the bypass switcher 506 via the output 524 and the input 530. The stunt switcher 504 may be connected to the bypass switcher 506 via the output 524 and the input 530. A bypass switcher may and often does have multiple inputs and a single output such that it may connect many sources to relatively fewer destinations.

Accordingly, provided that the router 502, the stunt switcher 504, and the bypass switcher 506 all have the appropriate input-to-output mappings, a VC sent from the RAPD 302 to the MCS 500 may be channeled through the entities in the MCS and sent out the MCS. Likewise, provided that the router 502, the stunt switcher 504, and the bypass switcher 506 all have the appropriate input-to-output mappings, streaming video sent from the SVS 400 to the MCS 500 may be channeled through the entities in the MCS and sent out the MCS.

In some instances, a source (e.g., the SVS 400) may be connected to the bypass switcher 506 (e.g., via the output 402 and the input 532). A distribution amplifier (not shown) may be used to split the output of the SVS 400 such that it may be sent to both the router 502 and the bypass switcher 506. This configuration may provide for a back-up solution in the event that a device such as the router 502 or stunt switcher 504 malfunctions. If such an event occurs while using this configuration, a master control operator may simply change the input-to-output mappings on the bypass switcher 506 to cause the source to send video to the air-chain system 600 for broadcast.

4. Automation System

The automation system 508 may be configured to perform or to cause performance of one or more functions related to the television-broadcasting system 100. The automation system 508 may include a processor 538, a data storage 540, a user-interface 542 (e.g., including a display device), and a communication interface 544, all of which may be connected by a connection mechanism (not shown). The processor 538 may include one or more general-purpose processors (e.g., microprocessors) and/or special-purpose processors (e.g., digital signal processors and/or application specific integrated circuits).

The data storage 550 may include one or more volatile and/or non-volatile storage components and may be integrated in whole or in part with the processor 538. The data storage 450 may take the form of a non-transitory computer-readable medium and may include a set of program instructions, that when executed by the automation system 508 (e.g., by the processor 538), cause performance of a set of functions. For example, the automation system 508 may cause the RAPS 300, the SVS 400, the MCS 500, the air-chain system 600, an entity included therein, and/or another entity to perform one of more of the functions described in this disclosure. The automation system 508 may cause such functions to be performed by sending instructions and/or other data via a corresponding communication interface and/or connection mechanism to the appropriate device.

The automation system 508 may receive data via the same path. In one example, the automation system 508 sends and receives data according to a video disk control protocol (VDCP). For example, the automation system 508 may receive from the bypass switcher 506, an indication of the input-to-output mappings used by the bypass switcher such that the automation system may determine whether the scheduled video was actually sent to the air-chain system for broadcast. The automation system 508 may use these indications to generate an as-run log, which is a report of what was actually broadcast.

In some instances, the automation system 508 may perform functions described herein as being performed by the traffic system 200. Likewise, in some instances, the traffic system 200 may perform functions described herein as being performed by the automation system 508. This may be the case, for example, where the traffic system 200 and the automation system 508 operate using a "live log" approach, where the traffic system 200 may be configured to query the automation system 508, manage the log and make scheduling-related decisions itself, and provide log entries (perhaps one at a time) to the automation system for processing.

E. Air-Chain System

Figure 6:
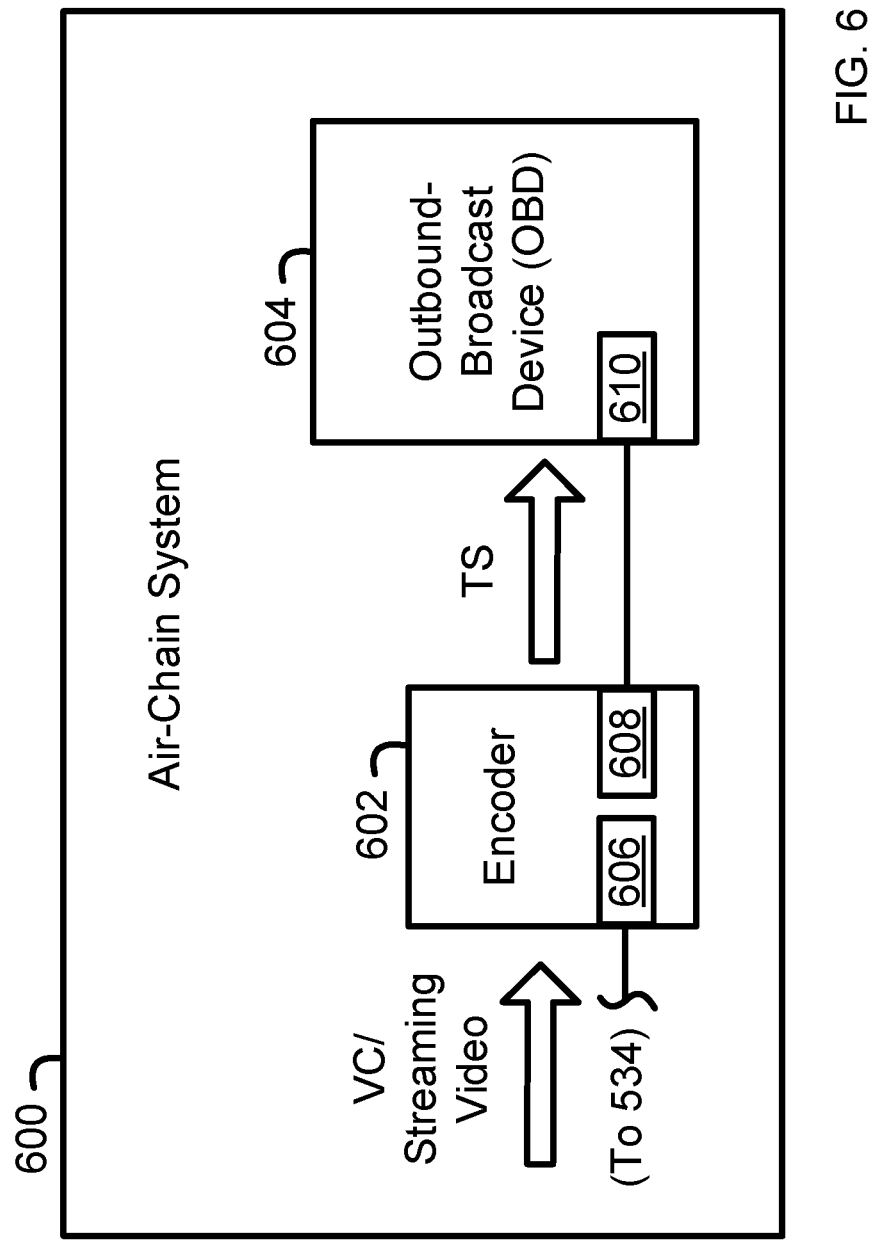
FIG. 6 is a simplified block diagram of an example air-chain system.

FIG. 6 shows the air-chain system 600 in greater detail. The air-chain system 600 may be configured to prepare and broadcast video received from the MCS 500 to an audience. The air-chain system 600 may include an encoder 602 and an outbound-broadcast device (OBD) 604.

The encoder 602 may be configured to receive video from a source entity, generate a transport stream (TS) (that includes the video), and send the generated TS to a destination entity. The TS may be described as including video, meaning that the TS includes the encoded representation of the video, among other things. The encoder 602 may include an input 606 and an output 608, each of which may be connected by a connection mechanism (not shown). The bypass switcher 506 may be connected to the encoder 602 via the output 534 and the input 606.

In one example, the encoder 602 may generate a TS by, among other things, encoding video based on the HD-SDI standard to video based on the MPEG 2 standard. An example of an encoder is the NetVX provided by Harris Corporation of Melbourne, Fla.

The OBD 604 may be configured to receive a TS from a source entity, and broadcast the TS (i.e., including video) to multiple destination entities for viewing by an audience. The OBD 604 may include an input 610, and the encoder 602 may be connected to the OBD via the output 608 and the input 610.

It should be noted that the term television-broadcast as used in this disclosure refers broadly to the distribution of video to an audience, and is not meant to be limited to distribution of video in any particular manner. Accordingly, the OBD 604 may take the form of a transmitter, satellite, or terrestrial fiber transmitter (e.g., any of which may correspond with a service provider). As another example, the OBD 604 may also take the form of a network connection (e.g., for broadcasting the TS to an audience via the Internet).

The television-broadcasting system 100 described above is one non-limiting example. Indeed, the disclosed systems may include some or all of the entities discussed above, and may be arranged in different ways as would be apparent to one of ordinary skill in the art.

III. Example Methods

Figure 7A:
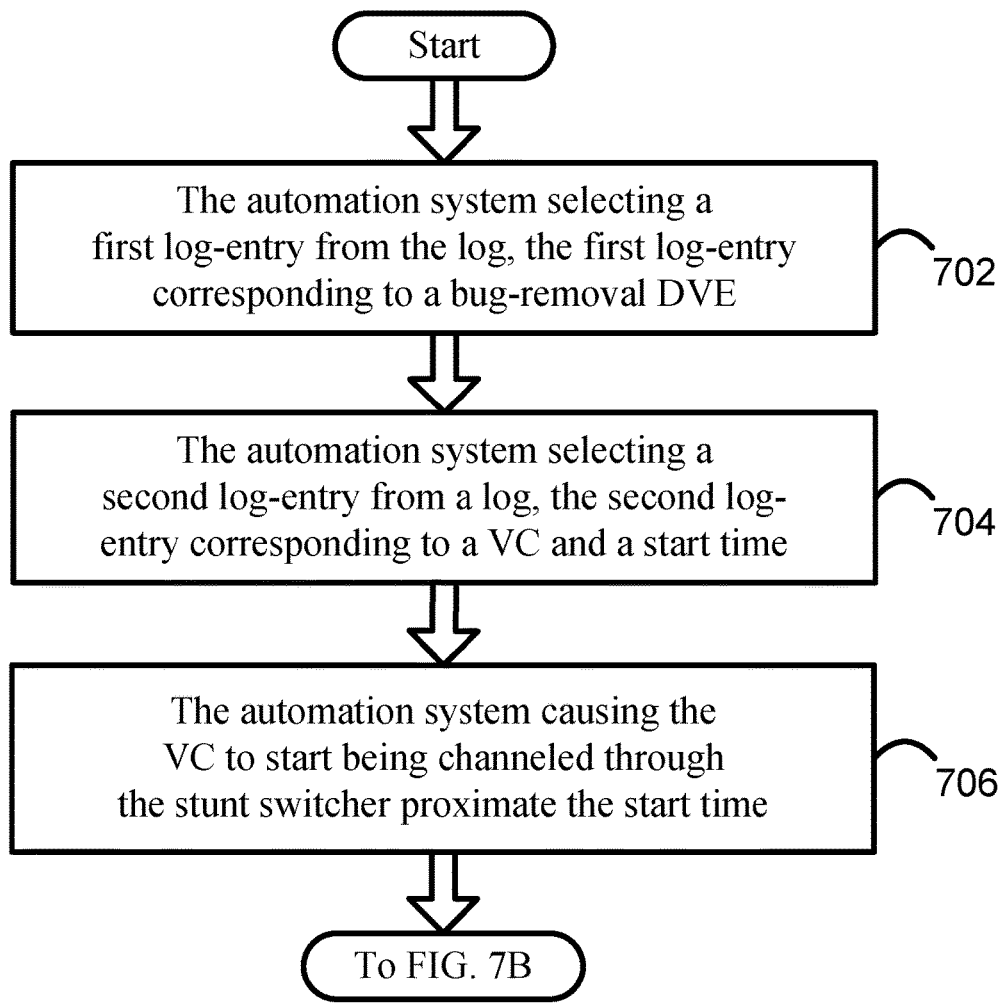
FIG. 7A shows a first part of a flow chart illustrating functions in accordance with an example method.
Figure 7B:
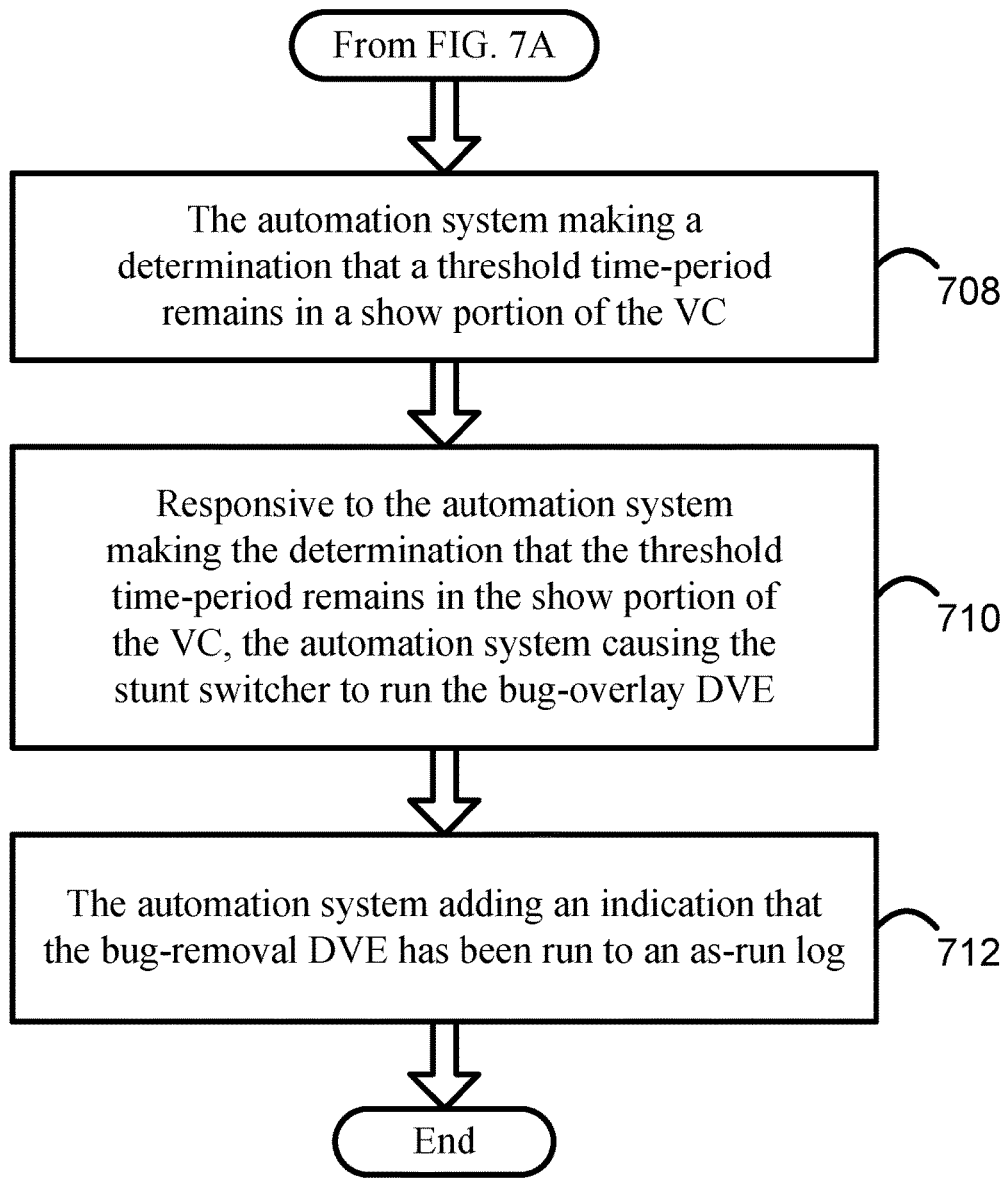
FIG. 7B shows a second part of the flow chart of FIG. 7A.

FIGS. 7A and 7B show a flow chart illustrating functions in accordance with an example method. At block 702, the method may involve the automation system 508 selecting (i.e., retrieving or accessing) a first log-entry from a log. Unlike a typical log-entry that corresponds to a VC, the first log-entry corresponds to a bug-removal DVE that is stored in the data storage 529 of the stunt switcher 504. An example manner in which the first log-entry may correspond with the bug-removal DVE is described in greater detail below. The first log-entry may also correspond to a start time (e.g., as represented by an absolute, calculated or manual start time stored in a start time-field of the first log-entry).

The automation system 508 may select the first log-entry according to the corresponding start time. For example, if the first log entry includes a start time represented as an absolute start time, the automation system 508 may select the first log-entry at the absolute start time (i.e., when a current time matches the absolute start time). As another example, if the first log-entry includes a start time represented as a calculated start time, the automation system 508 may select the first log-entry when the preceding log entry gets "completed" (e.g., when the VC of the previous log entry has played for its corresponding duration). Notably, in some instances the automation system 508 may select the first log-entry "ahead of schedule" (e.g., three hours before the start time). This may allow the automation system 508 and/or another entity to perform or prepare to perform certain functions in advance of the start time.

The first log-entry may also include a duration (e.g., in a duration field of the first log-entry). However, since the first log-entry does not correspond to a VC, but rather to a bug-removal DVE, the first log-entry may include a zero duration. As a result, the automation system 508 does not "pause" on the first log-entry when traversing the log (as it would for a log-entry that corresponds to a VC). In some instances, a traffic system may be configured to prevent use of a log entry having a zero duration. In such instances, it may be desired to configure the first log-entry with a nominal duration (e.g., one second) such that the traffic system deems the first log-entry acceptable.

At block 704, the method may involve the automation system 508 selecting a second log-entry from the traffic log. The second log-entry may correspond to a show-segment (or other type of) VC. In one example, the second log-entry includes a house identifier (e.g., stored in a house-identifier field of the log entry) that maps to the VC. The automation system 508 may select the second log-entry in a manner similar to that of the first log-entry.

The second log-entry may also correspond to the start time. Therefore, both the first and second log-entries may correspond to the same start time. For example, both the first and second log-entries may have the same absolute start time (e.g., stored in respective start-time fields). Alternatively, the second log-entry may have a calculated start time and may be the next log entry after the first log-entry to have a non-zero duration. As such, the first and second log-entries correspond to the same time.

The second log entry may also include a duration. The duration indicates the duration of the VC, and therefore the duration is a non-zero duration. This results in the automation system 508 "pausing" on the second log-entry for the duration of the VC (e.g., for the duration of the VC recorded in in the RAPD 302).

At block 706, the method may involve the automation system 508 causing the VC to start being channeled through the stunt switcher 504 proximate (i.e., at or near) the start time. For example, the automation system 508 may cause the RAPD 302 to retrieve the VC, channel it through the MCS 500 (and the included stunt switcher 504) and send it to the air-chain system 600 for broadcast. Since the RAPD retrieving the VC may take a few seconds, the automation system 508 may begin performing the related functions in advance of the start time such that the VC is channeled through the stunt switcher 504 proximate the start time.

At block 708, the method may involve the automation system 508 making a determination that a threshold time-period remains in a show portion of the VC. At block 710, the method may involve responsive to the automation system 508 making the determination that the threshold time-period remains in the show portion of the VC, the automation system causing the stunt switcher 504 to run the stored bug-removal DVE. As a result, the automation system 508 may remove any bug overlayed on the VC as a remainder of the VC is being channeled through the stunt switcher 504 (i.e., after the bug-removal DVE has been run).

The threshold time-period may therefore dictate when the bug-removal DVE is run, and may be set (e.g., by a user) as desired. For example, by setting the threshold time-period as fifteen seconds, the automation system 508 may cause the stunt switcher 504 to run the bug-removal DVE fifteen seconds before the end of the show portion of the VC. For example, in the event that the VC consists of a show portion and a barter-VC portion (i.e., including one or more commercials), and where the show portion is before the barter-VC portion, the stunt switcher 504 would run the bug-removal DVE approximately fifteen seconds before the start of the barter-VC portion. As another example, in the event that the VC consists only of a show portion (i.e., it does not include a barter-VC portion), the stunt switcher 504 would run the bug-removal DVE approximately fifteen seconds before the end of the VC. As such, the second log-entry may cause the VC to be broadcast, and the first log-entry may cause a bug-removal DVE to be run that removes any overlayed bug from the VC as the VC is being broadcast.

In one example, the automation system 508 causing the stunt switcher 504 to run the bug-removal DVE may involve the automation system sending a request to the stunt switcher 504 to run the bug-removal DVE (according to a protocol understood by the stunt switcher). In some instances, a parameter may be included in the log entry (e.g., in the one or more auxiliary-notation fields) that may be used to identify and/or configure the bug-removal DVE.

In some instances, it may be desired to track when the bug has been removed from the video. This may be particularly useful in connection with certain types of bugs, namely ones that involve advertisements that may be need to be tracked for billing purposes. As such, at block 712, the method may involve the automation system 508 adding an indication that the bug-removal DVE has been run to an as-run log. In one example, the automation system 508 may further indicate how long the bug was overlayed on video being broadcast, and/or the particular time when the removal occurred.

In one example, the first log-entry may include an identifier that maps to a set of scripts (or other program instructions), such as PHP-Hypertext-Preprocessor (PHP) scripts, that when executed by the automation system 508 cause the automation system to perform one or more of the functions, such as those at blocks 708 and 710 as described above. Notably, other types of scripts may also be used, including for example customized scripts that are configured to perform functions in a television-broadcasting environment. Such scripts may be executed by a corresponding interpreter installed in the automation system 508. In one example, the identifier may be stored in a house-identifier field of the log entry. The identifier may have a particular property (e.g., a predefined prefix) to allow the automation system 508 to differentiate between the identifier and a house identifier that is typically included in a house-identifier field (e.g., as with the second log-entry described above). As such, responsive to the automation system 508 determining that the first log-entry includes the identifier, the automation system 508 may execute the set of scripts and therefore, perform the corresponding functions. In one example, the automation system 508 may begin executing the set of scripts proximate the start time.

A further description of the manner in which an automation system 508 may use the identifier to trigger execution of the set of scripts is described in cross-referenced U.S. patent application Ser. No. 13/828,682, entitled "Systems and Methods for Causing a Stunt Switcher to Run a DVE,".

In view of the discussion above, an example set of scripts is provided below (parameter descriptions are shown inside arrow brackets):

GET_END_OF_SHOW_PORTION_POSITION (<position1>)
SET_CALLBACK (<position2>, <label>)
<label>: RUN_EFFECT (<stunt switcher identifier>, <DVE identifier>)
EXIT The "GET_END_OF_SHOW_PORTION_POSITION (<position1>)" determines the position of the end of the show portion of the "current" show-segment VC (i.e., the VC that is being broadcast simultaneously when the script is run). The command then returns the value of this position as position1. As such, the command "GET_END_OF_SHOW_PORTION_POSITION (P1)" would return the position of the end of the show portion of the current VC in P1. For example, in the event that the VC consists of a show portion and a barter-VC portion (i.e., including one or more commercials), the returned P1 would be the start of the barter-VC portion. As another example, in the event that the VC consists only of a show portion (i.e., it does not include a barter-VC portion), the returned P1 would be the end of the VC. In one example, making a determination as to whether or not the show-segment VC includes a barter-VC (and if so, making a determination of the starting position of the barter-VC portion), may be carried out using the technique described in U.S. patent application Ser. No. 13/629,497 entitled "Systems and Methods for Electronically Tagging a Video Component In a Video Package."

The "SET_CALLBACK (<position2>, <label>)" command causes the automation system 508 to resume executing the set of scripts at the label upon the position2 in the VC being reached. In one example, a function is embedded in the command to calculate <position2>. For example, the command "SET_CALLBACK (CALC(P1-15), LABEL))" may cause the automation system to calculate position2 as P1 (i.e., the end of the show portion of the VC) minus fifteen seconds (or another threshold time period). Therefore, at this time, execution of the set of scripts would resume (at the label).

The "<label>: RUN_EFFECT (<stunt switcher identifier>, <DVE identifier>)" command may cause the automation system 508 to cause a particular stunt switcher to run a particular effect number. For example, the command "<label>: RUN_EFFECT (504, 17)" may cause the automation system 508 to cause stunt switcher 504 to run a particular bug-removal DVE identified as DVE 17 (stored in a data storage of the stunt switcher). By use of the stunt switcher identifier and the DVE identifier, multiple scripts may be created to use various stunt switchers and bug-removal DVEs as desired. Since the RUN_EFFECT command is paired with the label, the RUN_EFFECT command is not executed until the label is reached. As such, in one example, the RUN_EFFECT command may not execute until the P1 minus fifteen seconds position of the VC is reached. As such, the bug is not removed until this time.

The "EXIT" command may terminate the automation system's 508 execution of the set of scripts. The example set of scripts used above is just one example, and many variations could be used. For instance, the SET_CALLBACK function may be configured to have an addition parameter, namely a <switch> parameter that may be designated WAIT or CONTINUE. A WAIT value indicates that the automation system 508 is to stop executing scripts until position 1 is reached, and then is to proceed with executing scripts starting at the label. Notably, this reflects the technique described in the example above. On the other hand, a CONTINUE value indicates that the automation system 508 is to execute all scripts up to the label, and then when position1 is reached, proceed with executing scripts starting at the label.

The set of scripts may also be used to perform other functions, including for example adding an indication that the bug-removal DVE has been run to an as-run log as described above. Further, the scripts may provide a "time out" period and a corresponding action to handle an instance in which the set of scripts runs for longer than the time out period. For example, the action may involve simply terminating execution of the set of scripts.

By using an identifier that maps to a set of scripts in the manner described above, a user (e.g., a traffic manager) may include an appropriate identifier in a traffic entry of the log to easily cause a stunt switcher to run a bug-removal DVE at a desired time, all as configured in the corresponding set of scripts. In one example, the second log-entry may be positioned as the next log-entry after the first log entry to have a non-zero duration. For example the log may include the first log-entry followed immediately by the second log-entry. Since both log entries have the same start time, the automation system 508 may perform functions related to both log entries simultaneously, or perhaps contemporaneously. For example, the automation system 508 may cause a VC to be channeled through a stunt switcher, while simultaneously executing a set of scripts. As the set of scripts execute, the corresponding functions may be performed, and therefore any bug may be removed from the VC.

Figure 8:
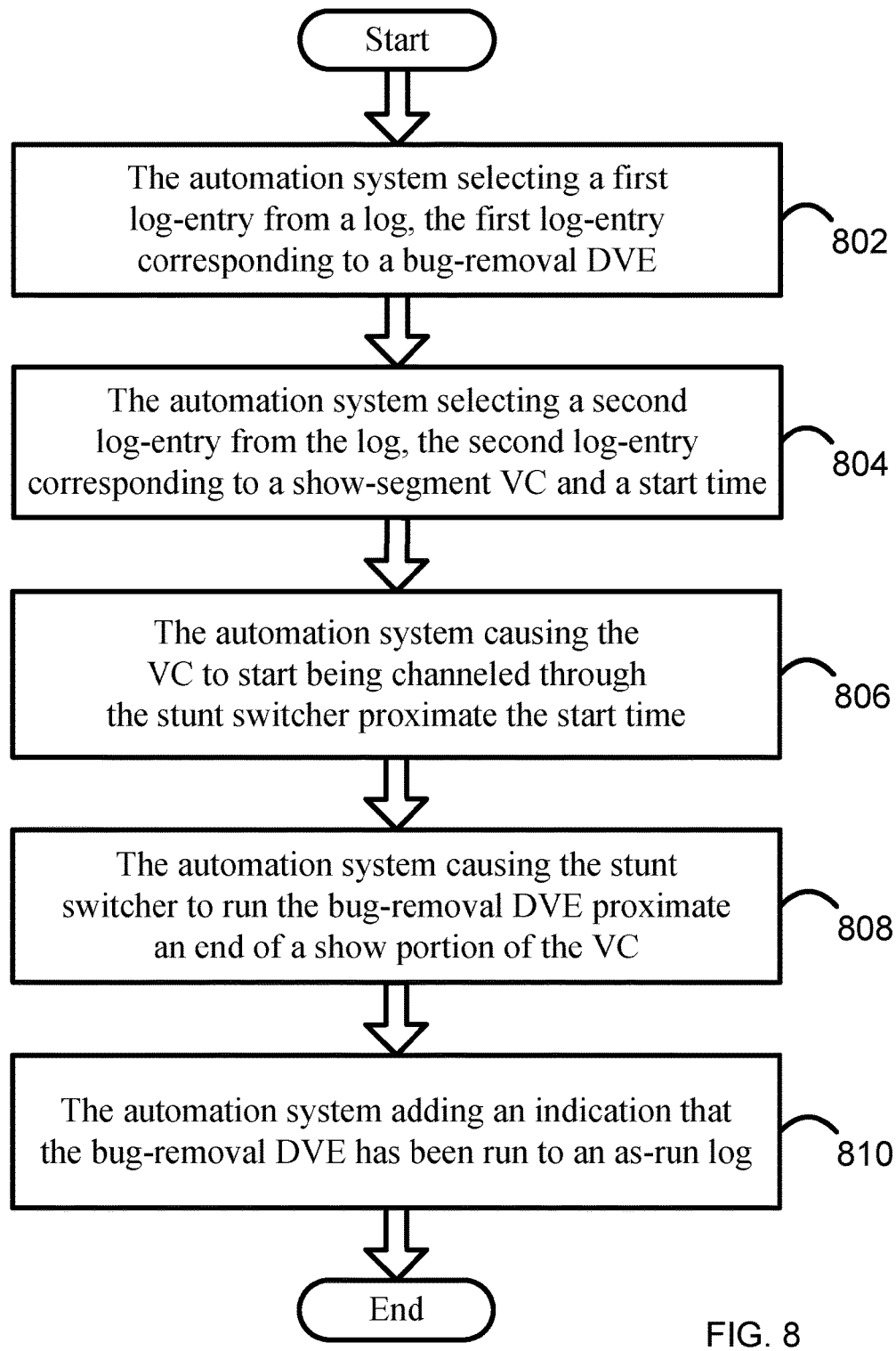
FIG. 8 shows a flow chart illustrating functions in accordance with another example method.

As a variation on the example method provided above, the automation system 508 may cause the stunt switcher 504 to run the bug-removal DVE when the show portion of the VC ends. FIG. 8 shows a flow chart illustrating functions in accordance with another example method that employs such a variation.

At block 802, the method involves the automation system 508 selecting a first log-entry from a log. Again, the first log-entry may correspond to a bug-removal DVE. At block 804, the method may involve the automation system 508 selecting a second log-entry from the log. Again, the second log-entry may correspond to a show-segment (or other type of) VC and a start time. At block 806, the method may involve the automation system 508 causing the VC to start being channeled through the stunt switcher 504 proximate the start time. At block 808, the method may involve the automation system 508 causing the stunt switcher 504 to run the stored bug-removal DVE proximate an end of a show portion of the VC, thereby removing any bug overlayed on the VC as a remainder of the VC is being channeled through the stunt switcher. At block 810, the method may involve the automation system 508 adding an indication that the bug-removal DVE has been run to an as-run log. Such functions may be performed by way of an identifier that maps to them as described above.

IV. Example Variations

While one or more functions of the disclosed methods have been described as being performed by the certain entities (e.g., the automation system 508), the functions may be performed by any entity, such as those included in the television-broadcasting system 100 described above. Further, the described steps throughout this application need not be performed in the disclosed order, although in some examples, an order may be preferred. Also, not all steps need to be performed to achieve the desired advantages of the disclosed systems and methods, and therefore not all steps are required. Further, the variations described throughout this disclose may be applied to any of the disclosed systems or methods.

Further, while select examples have been described, alterations and permutations of these examples will be apparent to those of ordinary skill in the art. Other changes, substitutions, and alterations are also possible without departing from the disclosed systems and methods in its broader aspects as set forth in the following claims.

The invention claimed is:

1. A non-transitory computer-readable medium having stored thereon program instructions that upon execution by a processor, cause performance of a set of function comprising:
    selecting a first log-entry from a traffic log, wherein the first log-entry corresponds to a bug-removal digital-video effect (DVE) stored in a stunt switcher;
    selecting a second log-entry from the traffic log, wherein the second log-entry corresponds to a show-segment video-component (VC) and a start time;
    causing the VC to start being channeled through the stunt switcher proximate the start time;
    making a determination that a threshold time-period remains in a show portion of the VC; and
    responsive to making the determination that the threshold time-period remains in the show portion of the VC, causing the stunt switcher to run the stored bug-removal DVE, thereby removing any bug overlayed on the VC as a remainder of the VC is being channeled through the stunt switcher.

2. The non-transitory computer-readable medium of claim 1, wherein a duration field of the first log-entry includes a zero duration value and wherein a duration field of the second log-entry includes a non-zero duration value.

3. The non-transitory computer-readable medium of claim 1, wherein the second log-entry is the next log entry after the first log-entry to have a duration field having a non-zero duration value.

4. The non-transitory computer-readable medium of claim 1, wherein the first log-entry includes the start time represented as an absolute start time, and wherein the second log-entry includes the start time represented as the absolute start time.

5. The non-transitory computer-readable medium of claim 1, wherein the VC consists of the show portion.

6. The non-transitory computer-readable medium of claim 1, wherein the VC consists of the show portion and a barter-VC portion, and wherein the show portion is before the barter-VC portion.

7. The non-transitory computer-readable medium of claim 1, wherein the first log-entry includes a house-identifier field and an identifier stored in the house-identifier field, wherein the identifier maps to a set of program instructions that when executed cause performance of the functions of (i) making the determination that the threshold time-period remains in the show portion of the VC; and (ii) responsive to making the determination that the threshold time-period remains in the show portion of the VC, causing the stunt switcher to run the stored bug-removal DVE; and wherein the set of functions further comprises responsive to determining that the first log-entry includes the identifier, executing the set of program instructions.

8. The non-transitory computer-readable medium of claim 7, wherein the set of program instructions comprises a set of PHP-Hypertext-Preprocessor (PHP) scripts.

9. The non-transitory computer-readable medium of claim 1, the set of functions further comprising:
adding an indication that the bug-removal DVE has been run to an as-run log.

10. A non-transitory computer-readable medium having stored thereon program instructions that upon execution by a processor, cause performance of a set of function comprising:
selecting a first log-entry from a traffic log, wherein the first log-entry corresponds to a bug-removal digital-video effect (DVE) stored in a stunt switcher;
selecting a second log-entry from the traffic log, wherein the second log-entry corresponds to a show-segment video component (VC) and a start time;
causing the VC to start being channeled through the stunt switcher proximate the start time; and
causing the stunt switcher to run the stored bug-removal DVE proximate an end of a show portion of the VC, thereby removing any bug overlayed on the VC as a remainder of the VC is being channeled through the stunt switcher.

11. The non-transitory computer-readable medium of claim 10, wherein a duration field of the first log-entry includes a zero duration value and wherein a duration field of the second log-entry includes a non-zero duration value.

12. The non-transitory computer-readable medium of claim 10, wherein the second log-entry is the next log-entry after the first log entry to have a duration field having a non-zero duration value.

13. The non-transitory computer-readable medium of claim 10, wherein the first log-entry includes the start time represented as an absolute start time, and wherein the second log-entry includes the start time represented as the absolute start time.

14. The non-transitory computer-readable medium of claim 10, wherein the VC consists of the show portion.

15. The non-transitory computer-readable medium of claim 10, wherein the VC consists of the show portion and a barter-VC portion, and wherein show portion is before the barter-VC portion.

16. The non-transitory computer-readable medium of claim 10, wherein the first log-entry includes a house-identifier field and an identifier stored in the house-identifier field, wherein the identifier maps to a set of program instructions that when executed cause performance of the functions of causing the stunt switcher to run the stored bug-removal DVE proximate an end of a show portion of the VC; and wherein the set of functions further comprises responsive to determining that the first log-entry includes the identifier, executing the set of program instructions.

17. The non-transitory computer-readable medium of claim 16, wherein the set of program instructions comprises a set of PHP-Hypertext-Preprocessor (PHP) scripts.

18. The non-transitory computer-readable medium of claim 10, the set of functions further comprising:
adding an indication that the bug-removal DVE has been run to an as-run log.

19. A television-broadcasting system comprising:
a stunt switcher; and
an automation system having a computer-readable medium including a set of program instructions, that when executed by the automation system, cause the automation system to perform a set of functions comprising:
selecting a first log-entry from a traffic log, wherein the first log-entry corresponds to a bug-removal digital-video effect (DVE) stored in the stunt switcher;
selecting a second log-entry from the traffic log, wherein the second log-entry corresponds to a show-segment video-component (VC) and a start time;
causing the VC to start being channeled through the stunt switcher proximate the start time; and
causing the stunt switcher to run the stored bug-removal DVE proximate an end of a show portion of the VC, thereby removing any bug overlayed on the VC as a remainder of the VC is being channeled through the stunt switcher.

20. The television-broadcasting system of claim 19, wherein a duration field of the first log-entry includes a zero duration value and wherein a duration field of the second log-entry includes a non-zero duration value.

* * * * *